United States Patent
Kalem et al.

(10) Patent No.: US 6,196,442 B1
(45) Date of Patent: Mar. 6, 2001

(54) METHOD FOR BRAZING ALUMINUM TUBE ASSEMBLIES

(75) Inventors: Brett Walter Kalem, Richmond, IN (US); James Arnold Bush, Livonia, MI (US); Victor Carrillo, Chihuahua (MX)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/080,801

(22) Filed: May 18, 1998

(51) Int. Cl.[7] .......... B23K 31/02; B23K 31/00; B23K 1/19; B23K 20/16; B23K 9/00; B23K 9/09; B23K 9/23; B23K 9/235

(52) U.S. Cl. .......... 228/135; 228/183; 228/248.1; 228/262.51

(58) Field of Search .......... 228/135, 183, 228/248.1, 212, 262.51, 175, 234.1, 56.3

(56) References Cited

U.S. PATENT DOCUMENTS

| | | | |
|---|---|---|---|
| 2,295,623 | * | 9/1942 | Armstrong .......... 285/289.1 |
| 2,874,981 | * | 2/1959 | Brady .......... 285/238 |
| 2,996,600 | * | 8/1961 | Gardner et al. .......... 219/61 |
| 3,410,581 | * | 11/1968 | Christensen .......... 285/21.2 |
| 3,760,142 | * | 9/1973 | Schoenthaler .......... 219/85 |
| 4,046,181 | * | 9/1977 | Barnsdale .......... 151/41.73 |
| 4,084,739 | * | 4/1978 | Koltz et al. .......... 228/168 |
| 4,294,395 | * | 10/1981 | Nayar .......... 228/220 |
| 4,758,112 | * | 7/1988 | Kawamura .......... 403/272 |
| 4,813,590 | * | 3/1989 | Deakin .......... 165/110 |
| 5,160,090 | * | 11/1992 | Friedrich et al. .......... 228/121 |
| 5,178,209 | * | 1/1993 | Aoki et al. .......... 165/110 |
| 5,222,850 | * | 6/1993 | Medal .......... 411/82 |
| 5,333,918 | * | 8/1994 | Crout et al. .......... 285/286 |
| 5,350,105 | * | 9/1994 | Delalle et al. .......... 228/56.3 |
| 5,363,910 | * | 11/1994 | Baba et al. .......... 165/153 |
| 5,429,182 | * | 7/1995 | Hanafusa .......... 165/67 |
| 5,509,473 | * | 4/1996 | Tokutake .......... 165/178 |
| 5,515,605 | * | 5/1996 | Hartmann et al. .......... 29/840 |

FOREIGN PATENT DOCUMENTS

406229696 * 8/1994 (JP) .......... 165/178

* cited by examiner

*Primary Examiner*—Patrick Ryan
*Assistant Examiner*—Zidia T. Pittman
(74) *Attorney, Agent, or Firm*—Larry I. Shelton

(57) ABSTRACT

There is disclosed a method for forming an aluminum tubular assembly in a controlled atmosphere brazing furnace. The assembly includes a variety of components of differing compositions, sizes and masses. Multiple, distinct brazing materials are used on the assembly to accommodate the differing components.

14 Claims, 1 Drawing Sheet

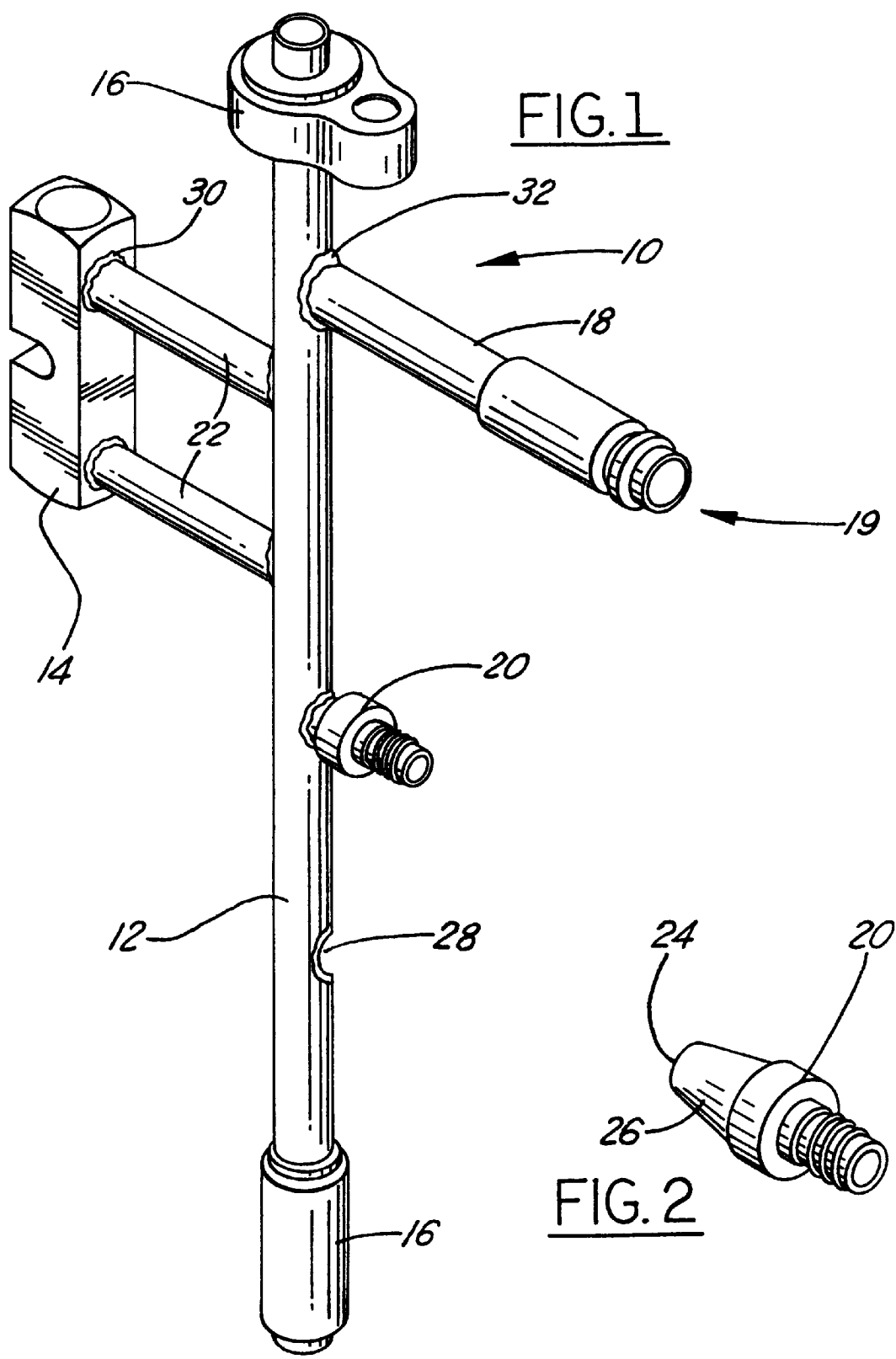

METHOD FOR BRAZING ALUMINUM TUBE ASSEMBLIES

BACKGROUND OF THE INVENTION

1. Field of the Invention

The present invention relates generally to tubing assemblies. More particularly, the present invention relates to a method for brazing aluminum tube assemblies in a controlled atmosphere furnace.

2. Disclosure Information

Historically, the most common method of brazing aluminum A/C fittings into tubing has been the open-air flame braze rotary table process. As is known in the industry, this type of process involves a rotating table onto which various tube assemblies are placed. As the table slowly rotates, the assemblies pass from one workstation to the next. Each table is manned by personnel who perform the operations of loading and unloading the assemblies onto the table. Although this process is used widely in the industry and provides adequate results, it is a highly specialized process and contains many complexities. The complexities arise from decisions addressing issues such as, whether to use filler metal in wire form, preformed rings or paste, or whether to choose a corrosive or non-corrosive fluxing agent. In addition, the rotary table provides many other problems that have to be controlled. Precise design of the table has to take into account issues that arise from adequate flame temperature, gas/air ratios, level of cooling (water, air), maintaining gas and air flow rates, air drafts (within a plant that can disturb flame patterns), and the development of the flame patterns. These are only a few of the attributes that need particular attention to insure a robust and capable process. Lastly, much of the success of a rotary braze table process depends on the part fixturing and maintaining the relationship of the part to the flame. Due to the design complexity of A/C tube assemblies many of the tables/fixtures are capable of brazing only one or two joints per table. Subsequently, when a new joint requires brazing, many times a new table and fixtures will be purchased. This occurs because of the vast differences in part design and the precision required to maintain part orientation to the flame.

Currently, tube assemblies made from steel alloys are successfully brazed in controlled atmosphere brazing ("CAB") furnaces. For example, U.S. Pat. No. 4,294,395 discloses a process for brazing ferrous parts in a copper brazing furnace. Heretofore, successful CAB brazing of aluminum tube assemblies, either at a tube-to-component joint or a tube-to-tube joint have not proven successful. Two primary difficulties arising from furnace brazing of aluminum tube assemblies are the need for self-fixturing the components and the different heat absorption/transfer characteristics of the aluminum components to be furnace brazed. To realize the best economic efficiencies of furnace brazing, the components should be self-fixturing, meaning that many parts can be brazed on a moving conveyor into the furnace with no additional mechanical fixturing needed. Aluminum tube assemblies have historically been flame brazed because fixturing was required due to the unique configuration of the assemblies.

Furthermore, as is well know, aluminum is an excellent heat conductive material. Aluminum tube assemblies, such as those used in automotive or commercial A/C systems includes various components of different compositions, sizes and masses. Because of these differences, the components heat up at different rates. For example, an aluminum manifold block, used for joining one aluminum tube to another, may weigh as much as twice a different component. As such, it takes longer for the heavier component to get to braze temperature. However, this presents a problem in that once the heavier component is at temperature for the brazing material or paste to flow, the braze paste used in connecting other, lighter components has already flowed and most likely, has been at temperature for too long, causing either a degradation in the paste, or complete run-off of the paste from the assembly. Therefore, it would be advantageous to propose a process which solves both of these issues.

It is an object of the present invention to provide a process for brazing aluminum tube assemblies in a controlled atmosphere brazing furnace without fixturing the components to the moving furnace conveyor.

It is a further object of the present invention to provide a method for brazing aluminum tube assemblies in a furnace, with the assembly having components of various sizes and masses.

SUMMARY OF THE INVENTION

The present invention overcomes the problems of prior art methods by providing a method for brazing a plurality of aluminum components of different compositions and masses to an aluminum tube member in a continuous furnace. The method of the present invention comprises the steps of providing an aluminum tube member having a plurality of apertures of predetermined diameter through a side thereof, providing a plurality of aluminum components to be joined to the tube member, each of the components including a stud member projecting therefrom having a diameter of tapering cross-section such that the diameter tapers from a diameter smaller to a diameter larger than the diameter of the tube member apertures, and forming a tube preassembly by fitting the plurality of components onto the aluminum tube member by inserting a stud member of a component into a predetermined tube member aperture until an interference fit therebetween is obtained. The method further comprises the steps of washing the tube preassembly in a predetermined aqueous solution, applying a first brazing paste material to preselected component-to-tube connections of the tube preassembly, and applying a second brazing paste to other preselected joints, the second brazing paste having a composition different than the first brazing paste. The method further comprises the steps of heating the furnace to a predetermined temperature of at least 580° C., establishing an atmosphere of predetermined composition in the furnace under equilibrium conditions in the absence of the tube assembly, passing the tube preassembly having the first and second brazing paste materials thereon through the atmosphere in the furnace at a rate of between 95 and 120 in/minute, and passing the tube preassembly through a cooling region in the furnace to cause the brazing paste materials to solidify and to form a tube assembly.

The present invention provides the advantage that an aluminum tubular assembly comprising many different components can be brazed in a furnace without the need for complex fixturing, thus saving time and cost during fabrication.

These and other features, objects and advantages of the present invention will become apparent from the drawings, detailed description and claims which follow.

BRIEF DESCRIPTION OF THE DRAWINGS

FIG. 1 is a perspective view of a typical tubular assembly manufactured in accord with the method of the present invention.

FIG. 2 is an enlarged view of one of the components of the assembly of FIG. 1.

DETAILED DESCRIPTION OF THE PREFERRED EMBODIMENTS

Referring now to the drawings, FIG. 1 shows an aluminum tubular assembly 10 as could be used in any of a number of fluid transport applications such as air conditioning or fuel delivery systems. The present invention will be explained with reference to an automotive air conditioning system in which a refrigerant fluid is transported to many different components within the system, such as a condenser, evaporator and compressor. As shown in FIG. 1, the tubular assembly 10 includes a tubular member 12 to which are attached a variety of other components such as a fluid manifold block 14, a coupling member 16 for coupling additional tube members together, a tubular branch 18 directing fluid to a different location through a charge valve 19 and a high or low pressure switch adapter 20. The manifold block 14 is connected to tubular member 12 by a pair of connecting tubes 22 at braze joint 30. The branch 18 is connected to tubular member 12 at braze joint 32. Each of these components, manifold block 14, coupling member 16, tubular branch 18, and high or low pressure switch adapter 20 can be fabricated from different aluminum alloys and each has a different size and mass. The present invention provides a method for brazing components such this as a single assembly in a controlled atmosphere furnace.

In order to secure each of the components to the tubular member 12, a stud projecting from each component is formed. FIG. 2 illustrates an enlarged view of the stud portion for the switch adapter 20. The stud 24 includes a knurled surface 26 comprising a series of generally longitudinal grooves. The stud 24 is tapered at about a 40–50° angle along its longitudinal axis to provide an interference fit when inserted into a corresponding aperture 28 in the tubular member 12. Maintaining this taper at approximately 45° in the preferred embodiment provides the greatest access for the braze material to secure the component to the tubular member with the least amount of braze run-off. It has been determined that the pilot diameter of the stud should be approximately 0.1 to 0.3 mm larger than the diameter to the aperture in the tubular member 12 to provide an adequate interference fit.

After providing the components with the stud projection, the components are washed in a known solution. The next step in the method of the present invention requires forming a tubular "preassembly" wherein all of the components to be brazed to the tubular member 12 are mechanically secured to the member 12 by the interference fit as explained above.

To bond the components to the tubular member, brazing paste is applied to each joint area. The joint area is that area between the component and tubular member 12 where a brazed connection is formed. Because of the different compositions, sizes and masses of the components, it has been determined that a single brazing material or paste does not provide suitable bonding. This is because the variations in the components results in different heat absorbing and transfer characteristics in the components. For example, the manifold block 14 may weigh as much as twice another component, requiring a longer time for it to be brought to an appropriate brazing temperature. During this waiting time, the braze paste may run-off a smaller component which absorbs heat more quickly. Selectively preheating the larger components is an alternative, but one which requires complicated and costly equipment. Therefore, the method of the present invention requires different brazing materials/pastes to be used at different components on the same assembly. The chart below lists some examples:

| COMPONENT | COMPONENT MATERIAL | PREFERRED PASTE | PASTE COMPOSITION (approximations) | FURNACE TEMP (MELTING RANGE (° C.) | LINE SPEED (inches/min) |
|---|---|---|---|---|---|
| Manifold Block | AA6005-T5 Al | A070 | Al (50%), Si (5%), Zn (45%) | 480–550 | 110 |
| Manifold Block (alternative) | AA6005-T5 Al | L1527-1070E-500 | Al (88%), Si (12%) | 577–582 | 68 |
| Low side/High side charge valve | 6001 Al | L1527-1070E-500 | Al (88%), Si (12%), mesh size of −120, 50% metal | 577–582 | 110 |

As can be seen in this table, the preferred paste compositions vary for the different components. As listed in this table, each of these brazing pastes can be purchased from Fusion, Inc. of Willoughby, Ohio. Different paste compositions have different melting points. By using a melting paste such as A070, it melts and brazes at a furnace temperature of between 480–550° C. at a line speed of about 122 inches/minute. The L1527-1070E-500 paste melts and brazes at between 577–582° C. at the same line speed. The manifold block has a larger mass than the charge valve, therefore it heats up more slowly. By using the A070 paste on the manifold block, it brazes the joint at a lower temperature while the charge valve is being simultaneously brazed at the higher temperature, since the charge valve heats up more quickly.

The method of the present invention requires that different pastes be applied to appropriate components in the preassembly. Applying the different pastes can be performed automatically or manually with syringe-like instruments filled with the pastes. Alternatively, braze rings fabricated from these different paste alloy compositions can be placed over the studs/joints to be brazed. After the pastes are applied, the tubular assembly is passed through a controlled atmosphere furnace at a predetermined rate. The atmosphere and line speed are selected depending on the components to be brazed. A typical line speed for an assembly as discussed herein is 110 inches/minute. obviously, the feed rate is dependent upon furnace length and part temperature profile as the part travels through the furnace. The present method recognizes that feed rates will change depending on a number of variables. The brazed assembly then passes through a cooling region in the furnace to solidify the brazed joints of the final assembly.

By using this method, flame brazing of individual joints is no longer necessary. Many joints can be brazed simultaneously, saving labor and costs. While the present invention has been described with respect to a very narrow field of application, the present invention can be utilized in many types of industries. It is the following claims, including all equivalents, which define the scope of the present invention.

What is claimed is:

1. A method for brazing a plurality of aluminum components of different compositions and masses to an aluminum tube member in a continuous furnace, comprising the steps of:

providing an aluminum tube member having a plurality of apertures of predetermined diameter through a side thereof;

providing a plurality of aluminum components to be joined to the tube member, each of the components including a stud member projecting therefrom having a diameter of tapering cross-section such that said diameter tapers from a diameter smaller to a diameter larger than the diameter of said tube member apertures;

forming a tube preassembly by fitting the plurality of components onto the aluminum tube member by inserting a stud member of a component into a predetermined tube member aperture until an interference fit therebetween is obtained establishing a component-to-tube connection;

applying a first brazing paste material to preselected ones less than all of the component-to-tube connections of said tube preassembly;

applying a second brazing paste material to other preselected ones of the component-to-tube connections, said second brazing paste material having a composition different than said first brazing paste material;

heating a furnace to a predetermined temperature of at least 580° C.;

establishing an atmosphere of predetermined composition in said furnace under equilibrium conditions in the absence of the tube preassembly;

passing said tube preassembly having said first and second brazing paste materials thereon through said atmosphere in said furnace at a predetermined rate; and passing said tube preassembly through a cooling region in said furnace to cause said brazing paste materials to solidify and to form a tube assembly.

2. A method according to claim 1, wherein the step of providing a plurality of aluminum components to be joined to the tube member further includes the step of forming a knurled surface on said stud member.

3. A method according to claim 2, wherein said step of forming a knurled surface on said stud member further includes forming a plurality of generally vertical grooves along an elongate axis of said stud member, said grooves being spaced apart by a predetermined amount.

4. A method according to claim 1, wherein said first brazing paste material flows at a temperature of between 480 and 550° C.

5. A method according to claim 4, wherein said second brazing paste material flows at a temperature lower than the temperature required for said first braze paste material to flow.

6. A method according to claim 1, wherein said second brazing paste material flows at a temperature of between 577 and 582° C.

7. A method according to claim 1, wherein said first braze paste material consists essentially of aluminum, silicon and zinc.

8. A method according to claim 7, wherein said first braze paste material includes about 45–55% aluminum, 3–7% silicon and 40–50% zinc.

9. A method according to claim 1, wherein said second braze paste material consists essentially of aluminum and silicon.

10. A method according to claim 9, wherein said second braze paste material includes about 83–93% aluminum and 7–17% silicon.

11. A method for brazing a plurality of aluminum components of different compositions and masses to an aluminum tube member in a continuous furnace, comprising the steps of:

providing an aluminum tube member having a plurality of apertures of predetermined diameter through a side thereof;

providing a plurality of aluminum components to be joined to the tube member, each of the components including a stud member having a knurled surface projecting therefrom having a diameter of tapering cross-section such that said diameter tapers from a diameter smaller to a diameter larger than the diameter of said tube member apertures;

washing the plurality of components in a predetermined aqueous solution;

forming a tube preassembly by fitting the plurality of components onto the aluminum tube member by inserting the stud member of each component into a predetermined tube member aperture until an interference fit therebetween is obtained establishing a component-to-tube connection;

applying a first brazing paste material to preselected ones less than all of the component-to-tube connections of said tube preassembly, said first brazing paste material having a melting temperature of between 480 and 550° C. and consisting essentially of aluminum, silicon and zinc;

applying a second brazing paste material to other preselected ones of the component-to-tube connections, said second brazing paste material having a melting temperature of between 577 and 582° C. and consisting essentially of aluminum and silicon;

heating a furnace to a predetermined temperature of at least 580° C.;

establishing an atmosphere of predetermined composition in said furnace under equilibrium conditions in the absence of the tube preassembly;

passing said tube preassembly having said first and second brazing paste materials thereon through said atmosphere in said furnace at a rate of between 97 and 110 in/minute; and passing said tube preassembly through a cooling region in said furnace to cause said brazing paste materials to solidify and to form a tube assembly.

12. A method according to claim 11, wherein said first braze paste material consists of essentially 50% aluminum, 5% silicon and 45% zinc.

13. A method according to claim 11, wherein said second braze paste material consists of essentially 88% aluminum and 12% silicon.

14. A method for brazing aluminum components of different compositions and masses to an aluminum tube member in a continuous furnace, comprising the steps of:

provinding an aluminum tube member having at least two apertures through a side thereof;

providing first and second aluminum components to be joined to the tube member, each of the components including a stud member projecting therefrom having a diameter of tapering cross-section such that the diameter tapers from a diameter smaller to a diameter larger than a diameter of an associated one of the tube member apertures;

forming a tube preassembly by fitting the first and second components onto the tube member by inserting the stud member of each of the components into the associated tube member aperture until an interference fit therebetween is obtained establishing a connection;

applying a first brazing paste to the connection of the first component stud member with the tube member;

applying a second brazing paste to the connection of the second component stud member with the tube member, the second brazing paste having a composition different than the first brazing paste;

heating a furnace to a predetermined temperature of at least 580° C.;

establishing an atmosphere of predetermined composition in the furnace under equilibrium conditions in the absence of the tube preassembly;

passing the tube preassembly having the first and second brazing pastes thereon through the atmosphere in the furnace at a predetermined rate; and passing the tube preassembly through a cooling region in the furnace to cause the brazing paste materials to solidify and to form a tube assembly.

* * * * *